United States Patent [19]

Hwang et al.

[11] Patent Number: 5,257,107
[45] Date of Patent: Oct. 26, 1993

[54] DIGITAL SIGNAL RECORDING SYSTEM FOR RECORDING DIGITAL SIGNALS ON VIDEO TAPE

[75] Inventors: Seong-ha Hwang, Suwon; Seong-do Lee, Seoul, both of Rep. of Korea

[73] Assignee: Samsung Electronics Co., Ltd., Kyunggi, Rep. of Korea

[21] Appl. No.: 634,556

[22] Filed: Dec. 28, 1990

[51] Int. Cl.$^5$ ............................................. H04N 9/79
[52] U.S. Cl. ..................................... 358/310; 360/22; 360/32
[58] Field of Search ................ 358/310, 334, 330; 360/32, 33.1, 35.1, 22, 23, 39, 47, 48, 36.2, 40

[56] References Cited

U.S. PATENT DOCUMENTS

| | | | |
|---|---|---|---|
| 4,285,014 | 8/1981 | Satoh | 360/32 |
| 4,533,964 | 8/1985 | Owaki et al. | 360/22 |
| 4,568,966 | 2/1986 | Lippel | 358/310 |
| 4,633,330 | 12/1986 | Yamamitsu et al. | 358/310 |
| 4,646,165 | 2/1987 | Hirota | 360/36.2 |
| 4,652,938 | 3/1987 | Murakami et al. | 358/310 |
| 4,670,797 | 6/1987 | Umenoto et al. | 358/310 |
| 4,677,421 | 6/1987 | Taniyama | 360/39 |
| 4,698,698 | 10/1987 | Collins | 360/36.2 |
| 4,730,223 | 3/1988 | Ikeda et al. | 360/39 |
| 4,764,820 | 8/1988 | Takeshita | 360/32 |
| 4,775,897 | 10/1988 | Umemoto et al. | 358/310 |
| 4,791,495 | 12/1988 | Umemoto et al. | 360/390 |
| 4,882,638 | 11/1989 | Onishi et al. | 360/32 |
| 4,887,169 | 12/1989 | Bannai et al. | 360/22 |
| 4,942,476 | 7/1990 | Koga et al. | 360/33.1 |
| 4,963,992 | 10/1990 | Doi et al. | 360/32 |
| 5,032,927 | 7/1991 | Watanabe et al. | 358/310 |
| 5,047,865 | 9/1991 | Inoue | 358/310 |

*Primary Examiner*—Howard W. Britton
*Assistant Examiner*—Thai Tran
*Attorney, Agent, or Firm*—Leydig, Voit & Mayer

[57] ABSTRACT

A video signal recording system in a digital VCR wherein an analog composite signal is converted into a digital component signal and the digitally converted signal is recorded on the video cassette tape. The video signal recording system adopts 2-channel, 4-head recording system instead of 2-channel, 2-head of ½ inches VHS system, in order to record one frame data on eight video tracks. The number of rotations of the head drum is 3600 rpm. A tape format of the video signal recording system comprising: predetermined gaps arranged in the uppermost and the lowermost ends of the video tape; a cue signal track for recording the cue signal thereon and a control track for recording the control signal arranged in an adjacent portion of each of inner sides of the gaps arranged in the uppermost and the lowermost ends; predetermined gaps arranged in each of inner sides of the cue signal track and the control track and a video signal recording field arranged between the gaps arranged in each of inner sides of the cue signal track and the control track; and predetermined gaps arranged in an upper end and a lower end of a video track when the video signal is recorded along with the video track of the video signal recording field, and audio tracks arranged in each of outer sides of the gaps arranged in the upper end and the lower end of the video track.

5 Claims, 4 Drawing Sheets

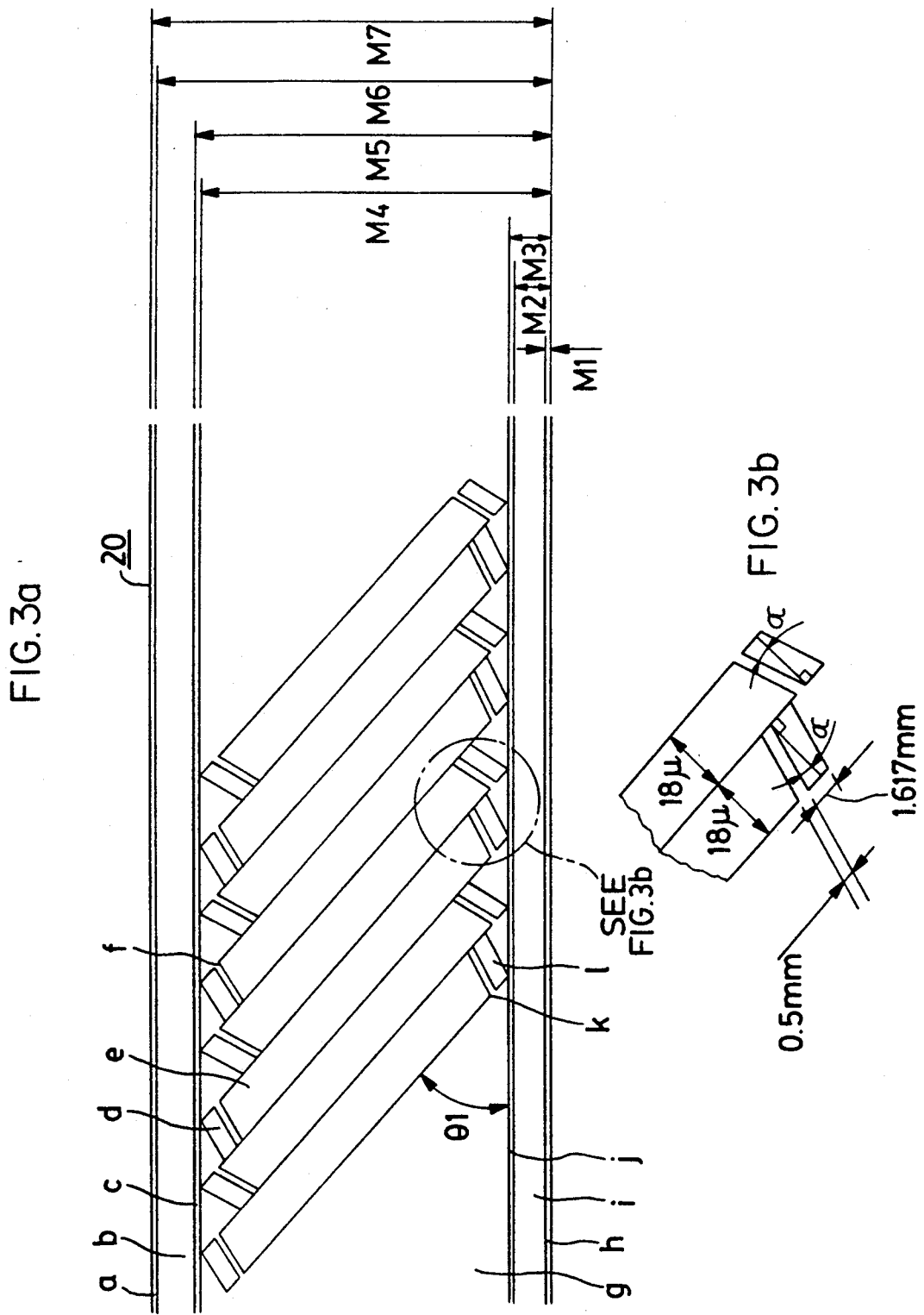

DIGITAL SIGNAL RECORDING SYSTEM FOR RECORDING DIGITAL SIGNALS ON VIDEO TAPE

BACKGROUND OF THE INVENTION

The present invention relates to a digital signal recording system for recording digital signals on a video tape, and, more particularly; to a digital signal recording system for converting composite TV signals into a digital component signals or receiving digital component signals directly input from outside of the system to inside of the system and for recording the digitally converted digital component signals or the directly input digital component signals on a video tape.

Generally, in the field of a video cassette tape recorders, recording technology using high definition and high density recording systems has been under development for a long time. In order to obtain a picture quality with a high definition, a digital signal recording system is preferable to an analog signal recording system in view of picture quality and an edit of the picture image. An existing analog composite NTSC signal is composed of a luminance signal with 320 lines and a chrominance signal with 120 to 40 lines, while a video signal utilized in the recently developed digital recording system is composed of a luminance signal of 520 lines and a chrominance signal of 260 lines in order to code the video signal in accordance with the international standard. Accordingly, the digital component recording method is adapted to a digital signal recording system.

In a conventional digital video cassette tape recorder(hereinafter referred to VCR), analog type video and audio signals are converted into digital signals, and then the digitally converted signals are inputted to a digital signal processor. This digital signal processor compresses data transmission bit rates because the amount of the digitally converted data input thereto is too numerous. The digital signal processor also codifies the digital data for correcting errors.

Error corrected data are recorded on the magnetic tape by a magnetic head through a modulation process, that is, a recording codification process.

In order to realize a digital VCR for use at home with the above-described principle, three technologies are required as follows: First, a high density recording technology for decreasing an occupying area per bit on a tape, second, a compression technology of the data transmission bit rate for decreasing an amount of picture image data to be recorded, and third, a technology for improvement of a recording medium. However, in realizing the above-described technologies, there have been notable defects; that is if a recording density is heightened, an error ratio is increased and if a picture compression degree is increased, a picture quality is degraded.

Thus, in a technological field to which the present invention is adapted, a variety of recording systems have been developed as means for realizing the fundamental functions described above because the characteristics of the recording system rely upon a means embodying the above-described fundamental functions in a digital signal recording system.

SUMMARY OF THE INVENTION

It is an object of the present invention to provide a digital signal recording system which increases picture data compression while maintaining a high quality picture. Therefore, in order to accomplish the above-stated objects, a digital signal recording system according to the present invention comprises:

an A/D converter for converting NTSC composite analog signals into digital signals;

an Y/C separator for separating a luminance signal and a chrominance difference signal from the digital output of the A/D converter;

a first and a second sub-Nyquist samplers for compressing a data transmission bit rate of the luminance signal and the chrominance difference signal outputted from the Y/C separator;

a mixer for arranging the chrominance difference signals R-Y and B-Y compressed and outputted from the second sub-Nyquist sampler alternately each other;

a first and a second Hadamard transformers for compressing on an average the luminance signal Y of 8 bits and the chrominance signals R-Y and B-Y of 8 bits respectively outputted from the first sub-Nyquist sampler and the mixer;

a first and a second vectior quantizer for classifying the data components transformed in the first and the second Hadamard transformer into a plurality of groups and for reducing the number of bits by predetermined bits through performing a two-dimensional vector quantization for each of the groups;

a first and a second error correction coder for adding an error correction bit using a Reed-Solomon code to the outputs of the first and the second vector quantizer, and for outputting data having a predetermined transmission bit rate with respect to each of the channels;

a first and a second modulator for converting the 8-bit data outputted from the first and the second error correction coder into 10-bit data by using 8-10 block code system;

a delay device for delaying the chrominance difference signals R-Y and B-Y outputted from the second modulator for a predetermined time; and a head drum for recording the luminance signal Y and the chrominance signals R-Y and B-Y of one frame outputted from the second modulator and the delay device, respectively on eight tracks in the tape by four heads.

Also, a video tape format according to the present invention adapted to a digital signal recording system and having a field of the video tape which is divided into a plurality of tracks in order to record a digital signal on the video tape comprises:

predetermined gaps arranged in the uppermost and the lowermost ends of the video tape;

a cue signal track for recording the cue signal thereon and a control track for recording the control signal arranged in an adjacent portion of each of inner sides of the gaps arranged in the uppermost and the lowermost ends;

predetermined gaps arranged in each of inner sides of the cue signal track and the control track and a video signal recording field arranged between the gaps arranged in each of inner sides of the cue signal track and the control track; and predetermined gaps arranged in an upper end and a lower end of a video track when the video signal is recorded along with the video track of the video signal recording field, and audio tracks arranged in each of outer sides of the gaps arranged in the upper end and the lower end of the video track.

BRIEF DESCRIPTION OF THE DRAWINGS

FIG. 3a and FIG. 3b illustrate in greater detail some features of the tape format arrangement of the present invention.

DESCRIPTION OF THE PREFERRED EMBODIMENT

An embodiment of the present invention will be described below with reference to the accompanying drawings.

Figure 1:
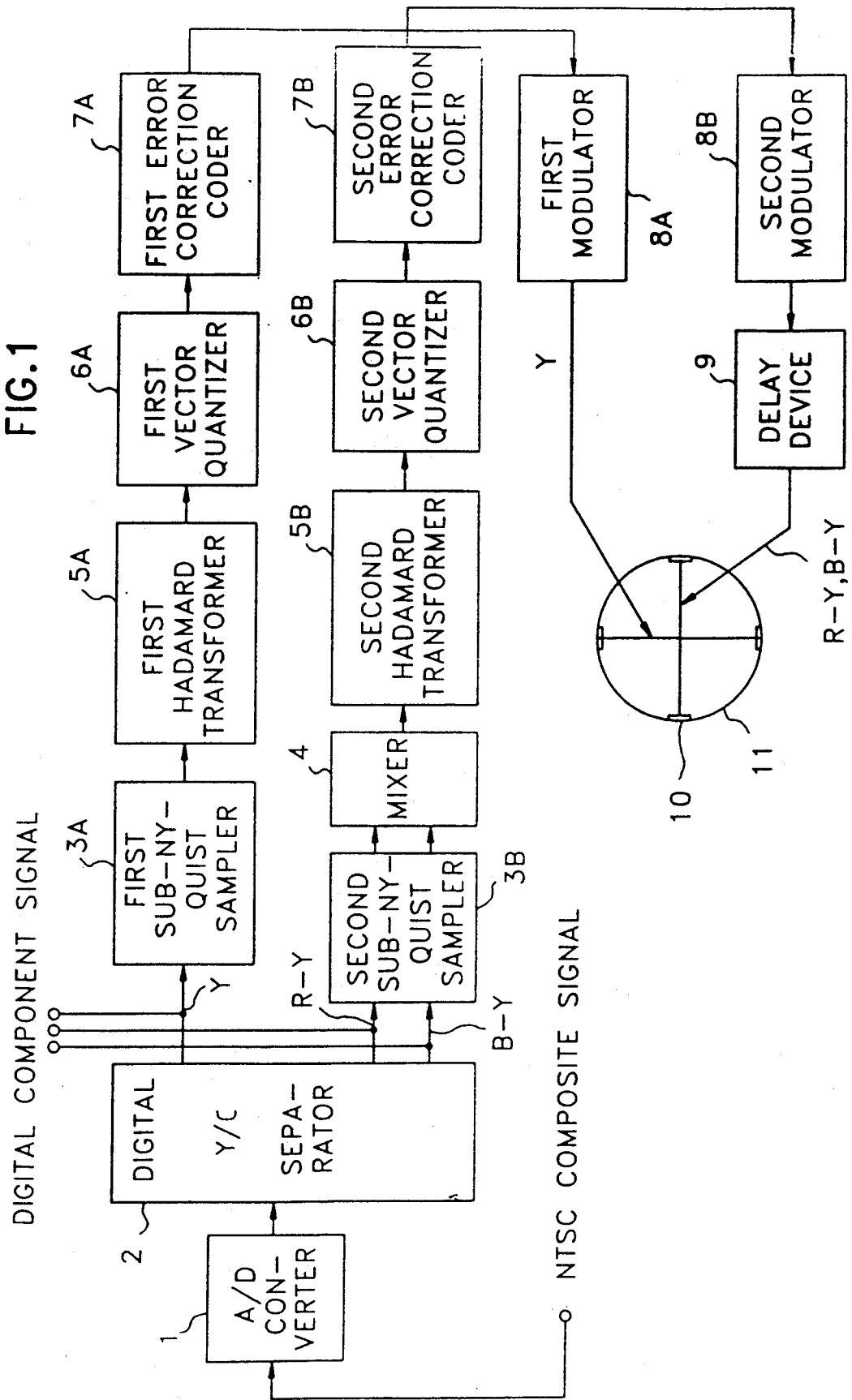
FIG. 1 is a block diagram schematically showing a recording system for recording a digital signal on a video tape according to the present invention.

Referring to FIG. 1, an A/D converter 1 converts an NTSC composite signal into a digital signal.

Figure 2A:
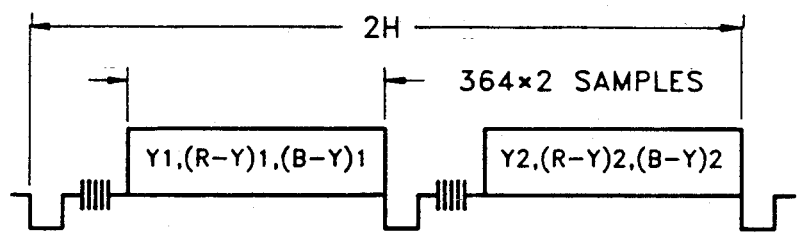
FIG. 2A is a waveform diagram showing a data structure recorded on a video tape according to the present invention.

Here, a sampling frequency is four times as large as a subcarrier, frequency that is, 14.3 MHz. The waveform of the signal shown in FIG. 2A shows data structure recorded on a video tape. A sync block is formed by 2H as a minimum unit because Hadamard transformation in Hadamard transformers 5A and 5B which will be described later on is formed by 2H as a minimum unit, in which H is used as a unit representing the period of the horizontal sync signal which is consequently equivalent to the duration of one horizontal scan on the display device. Accordingly, H denotes a horizontal sync signal having a frequence of $f_h = 15.734$ KHz, so that the period of H is equal to $1/f_h = 63.5$ $\mu$s. In the NTSC composite system, a digital Y/C (luminance/chrominance signal) separator 2 separates a luminance signal and a pair of chrominance difference signals R-Y and B-Y from the digital output signal of the A/D converter 1 because the luminance signal Y is multiplexed with chrominance difference signals R-Y and B-Y as shown in FIG. 2A. The Y signal output from the Y/C separator 2 is applied to a first sub-Nyquist sampler 3A, while the chrominance difference signals R-Y and B-Y are applied to a second sub-Nyquist sampler 3B. The recording system according to the present invention receives a digital component signal of the international standard for a high picture quality and records it on the tape for increasing the efficiency of use.

Investigating the frequency spectrum of the component signal, the luminance signal and the chrominance difference signal are separated on the frequency spectrum.

Accordingly, the luminance signal Y among the digital component signals is applied directly to the first sub-Nyquist sampler 3A, while the chrominance difference signals R-Y and B-Y are applied to the second sub-Nyquist sampler 3B. The data transmission bit rate of the Y signal applied to the first sub-Nyquist sampler 3A from the digital Y/C separator 2 is about 95 Mbps, and those of the B-Y and R-Y signals applied to the second sub-Nyquist sampler 3B are about 47.5 Mbps, respectively. These samplers 3A and 3B decrease the respective sampling frequencies, thereby compressing the input data transmission bit rate by half. A mixer 4 arranges the chrominance signals of R-Y and B-Y alternately in sequence, which are compressed in the second sub-Nyquist sampler 3B and are output therefrom.

First and second Hadamard transformers 5A and 5B compress the length of data in average to about 5 bits in respect both for the luminance signal Y of 8-bit output from the first sub-Nyquist sampler 3A, and the chrominance difference signals B-Y and R-Y output from the mixer 4.

Here, Hadamard transformation utilized in the first and the second Hadamard transformers 5A and 5B is a kind of an orthogonal transform, a plurality of picture elements are classified into a block, and decomposed into more independent, that is, less correlative components than a pattern coefficient determined in the sampling point.

If the video signal is Hadamard transformed, the transformed signal includes the frequency components proportional to the energy distribution of the signal. Then, the larger the power the frequency component has, the more bits are assigned, the smaller the power the frequency component has, the less bits are assigned, thereby enabling the bit compression. In the present embodiment, eight picture elements are classified into a block and two dimensional 8 degree Hadamard transformation is performed.

Accordingly, 8 bits the data forming each of the picture elements are decreased in accordance with the 8 kinds of the Hadamard transform coefficients.

First and a second vector quantizers 6A and 6B classify the 8 kinds of data components which are Hadamard transformed as described above into 4 groups, 2 by 2, and perform to quantization with 2-dimensional vectors for each of the groups.

This is a process for minimizing a quantization error by presetting a representative point adapted to a statistic distribution of the signal and quantizing two dimensionally, thereby saving the number of bits by about 0.5 bit in accordance with the vector quantization.

The data of eight bits applied to each of the input terminals of the first and the second Hadamard transformer 5A and 5B are Hadamard transformed, vector quantized, and compressed as the data of 4.5 bits, so that the data transmission bit rate is decreased to about 24 Mbps.

First and a second error correction coders 7A and 7B divide data of a picture screen into a plurality of blocks and perform a double coding operation for adding an error correction bit in accordance with both horizontal and vertical directions. In the present embodiment, a coding system using the RS(Reed-Solomon) code is adopted. This coding system has the characteristics that an error correction capability with regard to the error on burst is high and the code length can be freely selected.

First and a second modulators 8A and 8B convert 8 bit data output from the error correction coder 7A and 7B into 10 bit data. By adopting an 8–10 block code system, a high S/N ratio and a wide detection window are obtained. Here, the data represented as 8 bits (0 to 255 levels) per picture element corresponds to the quasi-balanced data including five 1's in which the number of the quasi-balanced data is $_{10}C_5 = 252$, and the remaining four quasi-balanced data are selected and supplemented 2 by 2, respectively from $_{10}C_4$ and $_{10}C_6$. The first and the second modulator 8A and 8B output the Y signal, R-Y signal and B-Y signal with 30 Mbps data transmission bit rate for the respective channels.

The Y signal output from the first modulator 8A is recorded on the magnetic tape through the head 10 on a drum 11, while the R-Y and B-Y signals output from the second modulator 8B have a time difference of about 1/480 seconds for the Y signal. Accordingly, the chrominance difference signals R-Y and B-Y are recorded on the magnetic tape by the head on the drum 11 via a delay device 9 having a delay time of about 1/480 seconds.

In a digital video signal recording system according to the present invention, a prior driving mechanism of an ½ inches VHS system is adopted in order to drive the head drum according to the present invention.

When an analog signal is recorded on the magnetic tape with a prior driving mechanism, a 2-channel 2-head recording system is adopted, however, in the present invention, a 2-channel 4-head recording system by assigning 2 heads per channel is adopted.

The recording data per frame constituting a picture screen is composed of 60 Mbits × 1/30 seconds, that is, about 2 Mbits.

In the present embodiment, the data of one frame, that is, the data of 2 Mbits are divided and recorded on eight tracks.

Accordingly, the data recorded on the respective tracks are 0.25 (2 Mbits divided by 8) Mbits. Considering that the ½ inches VHS mechanism is utilized in the present invention, the tape used in the present invention is ½ inches wide, too.

The track length of this tape is about 97.39 mm. Thus, with relation to a plurality of bits recorded on a track, the length of each of bits is 97390 $\mu$m divided by 0.25 Mbits, that is, about 0.380 $\mu$m. Also, as one wavelength is composed of two bits a shortest recording wavelength $\lambda$ is 0.76 $\mu$m.

The number of rotations of the head drum in a prior analog video tape recorder is 1800 rpm, while that of the head drum in a digital video tape recorder according to the present invention is 3600 rpm because the data of 2 Mbits per frame are recorded on the tape with the 2-channel 4-head system.

Figure 2B:
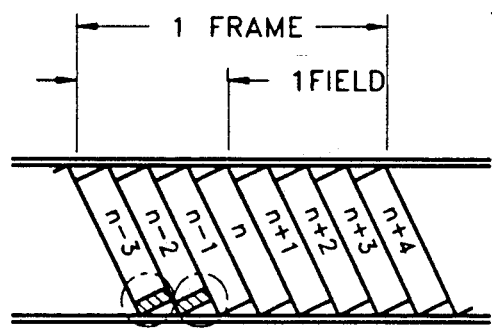
FIG. 2B illustrates a tape format in which one frame data are recorded on eight tracks of a video tape.
Figure 2C:
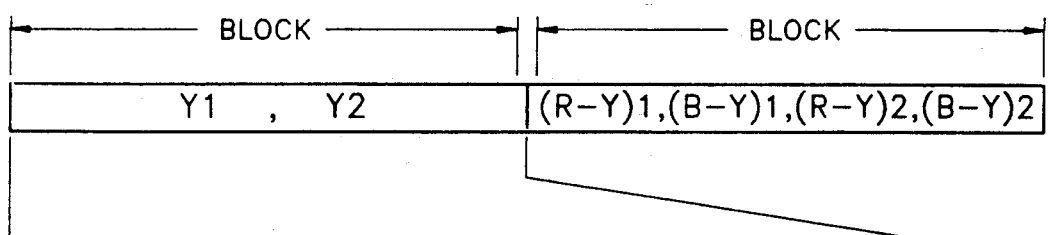
FIG. 2C illustrates a detailed tape format in which video signals of 2H duration are recorded on two adjacent tracks of the video tape.
Figure 2D:
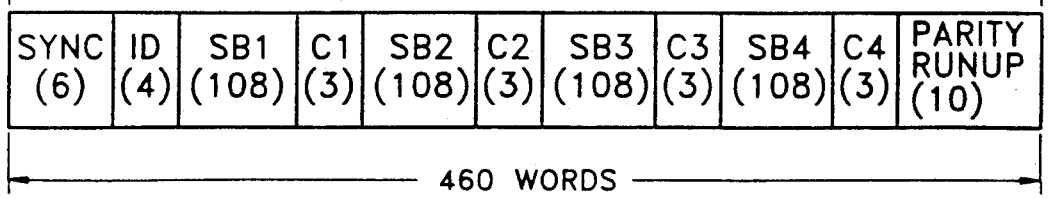
FIG. 2D illustrates a detailed structure of the luminance signal block shown in FIG. 2C.

FIG. 2B to FIG. 2d illustrate a tape format for explaining a recording system according to the present invention, that is, a recording system for recording the signal after the signal shown in FIG. 2A passes through the data compression process and the data modulation process.

The data of one frame are recorded on 8 tracks of (n−3), (n−2), - - - , (n+2), (n+3) and (n+4) as shown in FIG. 2B, two fields constituting one frame are occupied by four tracks, respectively. Each of the tracks is composed of 65.6 blocks.

In FIG. 2B, the luminance signals are recorded on the odd tracks of (n−3), (n−1), (n+1) and (n+3), while the chrominance difference signals R-Y and B-Y are recorded on the even tracks of (n−2), (n), (n+2) and (n+4).

FIG. 2C illustrates a detailed tape format in which the video signal of 2 H duration shown in FIG. 2A is recorded on two adjacent tracks of the video tape. The luminance signals Y1 and Y2 are recorded in one block of the odd track of n−3, and the chrominance difference signals (R-Y)1, (B-Y)1, (R-Y)2 and (B-Y)2 shown in FIG. 2 are recorded in another block of the even track of n−2.

FIG. 2D illustrates a detailed structure of the luminance signal block shown in FIG. 2C. In FIG. 2D, the figures in the parentheses represent the word length of the corresponding regions, and one block is composed a total of 460 words. Here, SYNC represents a sync block, ID represents a field number for indicating a sequence of the sync block, SBi represents a sub-block of ith(i=1,2,3,4) data, Ci represents CRCC(Cyclic Redundancy Check Code) for the SBi, PAPITY represents an RS code of 4 words and RUNUP represents a data of 2 words for the clock recovery.

In conventional video tape recorders, an analog signal is utilized, and the data within the boundary of frequency less than 10 MHZ are recorded, while in the present digital video tape recorder, the analog signal is converted into a digital signal. Accordingly, the amount of data is increased by about 60 Mbits (30 MHZ), with the result that the recording density has to be maintained as a high density in order to record the data as described above.

Thus, a head according to the present invention is composed of the head of an alloy laminated membrane type.

This head of the alloy laminated membrane type is composed of a supporting core forming an amorphous metal layer of Co-Nb-Zr-Ta and a thin insulation layer of $SiO_2$ are alternately stacked upon each other on a ceramic base plate.

Accordingly, a saturation magnetic flux density is large and a magnetostriction effect avoided. In addition, the tape format is constituted as shown in FIG. 2B, FIG. 3a, and FIG. 3b, and the material of the tape is made of a metal coated tape in order to enable a high density recording of 30 MHZ.

The overall tape format arrangement will be described below with reference to FIG. 3a and FIG. 3b, in comparison with the prior tape format arrangement for recording the analog signal according to the VHS system shown in FIG. 4a and FIG. 4b.

As described above, the recording system according to the present invention utilizes a driving mechanism of conventional ½ inch VHS type video tape recorders, accordingly the width of the tape is made of ½ inches in size.

Figure 4A:
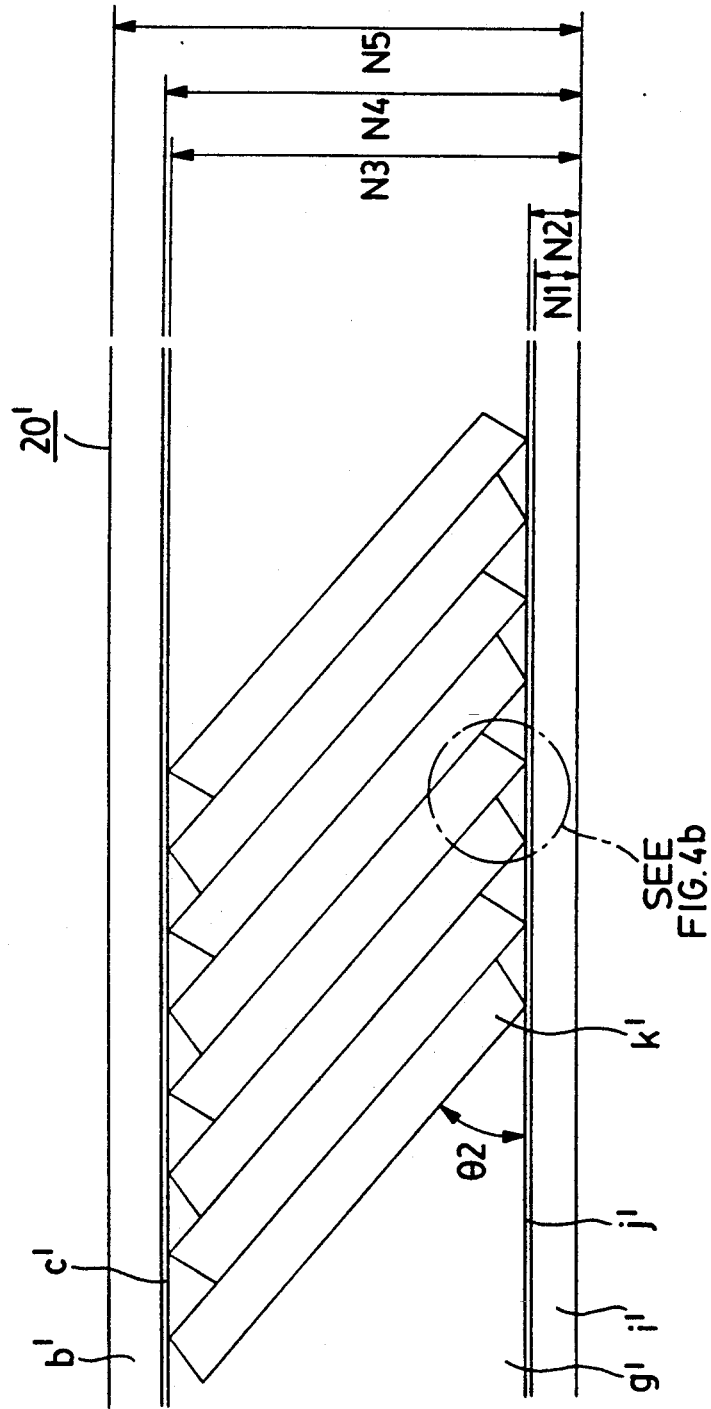
FIG. 4a and FIG. 4b illustrate the VHS type video tape format of the prior art.
Figure 4B:
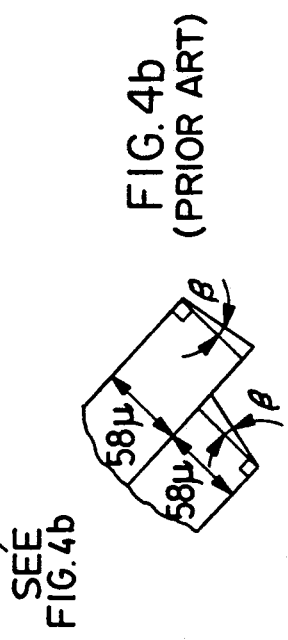

As shown in FIG. 4a and FIG. 4b as the prior art, an audio track b' is located in the upper part of the tape 20' excluding a video signal recording field g'. However, as shown in the drawing symbols d and l of FIG. 3a and FIG. 3b in the present invention, the audio tracks are located in both ends of the video track and spaced with the predetermined gaps f and k from both ends of the video track within the video signal recording field g, in which the video head records the audio signal on the tape, too. The control signals are recorded on the control track i and i' provided in the lower end of the tape as shown in FIG. 3a, FIG. 3b, FIG. 4a, and FIG. 4b.

The cue signal track b in the tape 20 of the present invention is arranged in the upper end of the tape, that is, the position of the audio track b' of FIG. 4a and FIG. 4b.

The predetermined gaps c' and j' are located at the bottom of the audio track b' and on the control track i' respectively arranged in both upper end and lower end of the video signal recording field g' in the tape 20' of FIG. 4a and FIG. 4b in the prior art. The predetermined gaps c and j are located at the bottom of the cue signal track b and on the control track i, respectively arranged in both upper end and lower end of the video signal recording field g in the tape 20 of FIG. 3a and FIG. 3b in the present invention. In addition the predetermined gaps a and h are provided in the uppermost end and the lowermost end of the tape 20 of FIG. 3a and FIG. 3b respectively in order to prevent an error occurrence during the transportation of the tape. The measures of the respective tracks of the tapes shown in FIG. 3a, FIG. 3b, FIG. 4a, and FIG. 4b are represented respectively in Table I and Table II.

TABLE I

| M1 | M2 | M3 | M4 | M5 | M6 | unit[mm] M7 |
|---|---|---|---|---|---|---|
| 0.10 | 0.80 | 0.90 | 11.50 | 11.60 | 12.55 | 12.65 |

TABLE II

| N1 | N2 | N3 | N4 | unit[mm] N5 |
|---|---|---|---|---|
| 0.75 | 0.90 | 11.50 | 11.65 | 12.65 |

As can be seen from Table I, a plurality of gaps a,c,h and j arranged on the tape are all 0.1 mm long, the cue signal track b is 0.95 mm wide, the video/audio signal recording field g is 10.60 mm wide, and the control track i is 0.7 mm wide. The recording system according to the present invention adopts double azimuth type, and the azimuth angle $\alpha$ according to the present invention is $\pm 15$ degrees. This azimuth angle $\alpha$ is relatively larger than the azimuth angle $\beta$ according to the prior art, that is, $\pm 6$ degrees, thereby reducing the effect of cross talk.

The head drum according to the present invention is rotated with 3600 RPM. Accordingly, with the head drum having the same diameter as that of a ½ inch driving mechanism, the circumferential linear velocity Vd is represented as follows:

$$Vd = r \times \omega$$
$$= \pi \times D \times \omega$$
$$= \pi \times 62 \times 60 = 11686.724 \text{ [mm/sec]}$$

where,
r is a radius of head drum [mm],
D is a diameter of head drum [mm],
w is an angular velocity [rad/sec].

Thus, a relative velocity Vr between the head and the tape is represented as follows:

$$Vr = Vd - Vt$$
$$= (Vd \cos\theta - Vt) i + Vd \sin\theta j$$

$$|Vr| = \{(Vd \cos\theta - Vt)^2 + (Vd \sin\theta)^2\}^{\frac{1}{2}}$$
$$= (Vd + Vt^2 - 2Vt \cdot Vd \cos\theta)^{\frac{1}{2}}$$

where, Vt is a velocity of the tape [mm/sec], $\theta$ is a drum lead angle degree corresponding to a track recording angle during the tape stop, that is, 5.935 degrees.

Thus, the actual track slope angle of the tape (track recording angle) $\theta 1$ is represented as follows:

$$\theta 1 = \tan^{-1}[Vd \sin\theta/(Vd \cos\theta - Vt)]$$
$$= 5.956 \text{ degrees}$$

That is, the track slope angle $\theta 1$ according to the present invention is 5.956 degrees, while the track slope angle $\theta 2$ of the prior art is 5.935 degrees.

The magnitude of the relative velocity Vr is represented as follows:

$$Vr = (Vt^2 + Vd^2 - 2VtVd \cos\theta 1)^{\frac{1}{2}}$$
$$= \{(41.708)^2 + 11686.724)^2 - 2 \times 41.708 \times 11686.724 \times \cos 5.935\}^{\frac{1}{2}}$$
$$= 11645.240 \text{ [mm/sec]}$$

By the way, the width of the video track P is obtained by the following steps.

$$P = Vt[\text{mm/sec}] \times 1/30 \text{ sec} \times 1/8 \text{ track} \times \sin\theta 1$$
$$= 41.708 \times 1/30 \times 1/8 \times \sin 5.956$$
$$\approx 18.033 [\mu m]$$

The video track e is also reduced by [the length of the audio track×2]+[the lengths of the gaps f and k].

The lengths of the gaps f and k are all 0.50 mm, and the lengths of the audio tracks d and l are all 1.617 mm, The length of the audio track is calculated by the following steps.

The recording velocity and recording wavelength of the audio tracks d and l are 2 Mbps and 0.76 $\mu$m, identical to those of the video track e, respectively.

Thus, the total length Lt of the audio tracks d and l is represented as follows:

$$Lt = \lambda/2 \times \text{recording velocity} \times 1/30 \times 1/8 \text{ track}$$
$$= 0.76/2[\text{mm/bit}] \times 2[\text{Mbit/sec}] \times 1/30[\text{sec}] \times 1/8$$
$$= 0.76/240 \times 100[\text{mm/sec}] = 3.166[\text{mm/track}]$$

Thus, the length Ls of the respective audio tracks d and l is represented as follows:

$$Ls = Lt/2 = 1.583 [\text{mm/track}]$$

As described above, the present invention adopts a driving mechanism of ½ inch according to the conventional VHS systems without any great modifications, however, the present invention can realize a digital recording system having a new tape format arrangement.

What is claimed is:
1. A digital signal recording system comprising:
    an A/D converter for converting NTSC composite analog signals into digital signals:
    a Y/C separator for separating a luminance signal and first and second chrominance difference signals from the digital output of the A/D converter;
    first and second sub-Nyquist samplers for compressing a data transmission bit rate of the luminance signal and the first and second chrominance difference signals output from the Y/C separator;
    a mixer for arranging the first and second chrominance difference signals compressed and output from the second sub-Nyquist sampler in alternating sequence with each other;
    first and second Hadamard transformers for further compressing the luminance signal and the first and second chrominance signals respectively output from the first sub-Nyquist sampler and the mixer;

first and second vector quantizers for classifying data components transformed in the first and second Hadamard transformers into a plurality of groups and for reducing a number of bits by a predetermined bit by two-dimensional vector quantization of each of the groups;

first and second error correction codes for adding an error correction bit using a Reed-Solomon code to the output of the first and the second vector quantizers, and for outputting data having a predetermined transmission bit rate with respect to each of the channels;

first and second modulators for converting 8-bit data output from the first and the second error correction codes into 10-bit data by using an 8-10 block code system;

a delay device for delaying the first and second chrominance difference signals output from the second modulator for a predetermined time; and a head drum for recording the luminance signal and the first and second chrominance difference signals of one frame output from the second modulator and the delay device, respectively, on eight tracks of the tape with four heads.

2. A digital signal recording system as claimed in claim 1, comprising a driving mechanism for driving said head drum, said driving mechanism comprising a ½ inch VHS type mechanism.

3. A digital signal recording system as claimed in claim 1, wherein said head drum comprises a head of an alloy laminated membrane type.

4. A digital signal recording system as claimed in claim 1, wherein the tape is made of a metal coated tape.

5. A digital signal recording system as claimed in claim 2, wherein said driving mechanism drives said head drum at a speed of 3600 rpm.

* * * * *